United States Patent Office 3,347,762
Patented Oct. 17, 1967

3,347,762
PROCESS FOR THE PRODUCTION OF IMIDO-CARBONYL CHLORIDES AND SIMILAR ORGANIC COMPOUNDS CONTAINING NITROGEN AND CHLORINE COMBINED IN AN —N=CCL— RADICAL
Hans Holtschmidt and Wilfried Zecher, Cologne-Stammheim, Germany, assignors to Farbenfabriken Bayer Aktiengesellschaft, Leverkusen, Germany, a German corporation
No Drawing. Filed Aug. 28, 1962, Ser. No. 220,054
Claims priority, application Germany, Sept. 13, 1961, F 34,920; Nov. 9, 1961, F 35,319
8 Claims. (Cl. 204—158)

The present invention relates to a new process for the production of organic nitrogen compounds containing imide-chloride groupings.

In copending application Serial No. 187,210 filed April 13, 1962, a process is described according to which chloro-substituted methyl isocyanide dichlorides are obtained by the chlorination of dimethyl carbamic acid chloride at temperatures above 160° C.

Our copending application Serial No. 220,070, filed August 28, 1962, now Patent No. 3,251,760, divided into Serial No. 446,394, filed April 7, 1965, now Patent No. 3,251,761 and into Serial No. 446,402, filed April 7, 1965 is concerned with a process for the production of organic nitrogen compounds which contain an imide-chloride grouping

by first of all reacting a compound of the formula

in which $R_1$ and $R_2$ separately stand for an alkyl or aryl group which may be substituted by halogen, cyano, aryl, alkyl, amino or imino groups, and in which $R_1$ and $R_2$ together with =N— jointly stand for an isocyclic or heterocyclic ring, and in which $R_3$ stands for a methyl or an aryl group which can be further substituted; with chlorine at temperatures below 140° C. to the extent that all replaceable hydrogen atoms are replaced by chloro-atoms, and then treating the chlorination product thus obtained with chlorine at temperatures between 140° C. and 300° C., whereby alkyl chloride is split off.

It has been found that organic nitrogen compounds which contain the imide-chloride grouping

can be obtained by first of all reacting a compound of the formula

in which $R_1$ and $R_2$ separately stand for an alkyl or aryl group which may be substituted by halogen, cyano, aryl, alkyl, amino or imino groups, and in which $R_1$ and $R_2$ together with =N— jointly stand for an isocyclic or heterocyclic ring, and in which X stands for an acyl group; with chlorine at temperatures below 140° C. to the extent that all replaceable hydrogen atoms are replaced by chloro-atoms, and then treating the chlorination product thus obtained with chlorine at temperatures between 140° C. and 300° C., whereby acyl chloride is split off.

As acyl groups there may be mentioned —COCl, —COBr, —COF, —COR (R being an alkyl or aryl radical), —CN, —SO$_2$Cl, —RSO$_2$ (R again being an alkyl or aryl radical).

For the reaction according to the invention the above mentioned temperature control is also of great importance. Thus, in the majority of cases, totally resinified black reaction products are obtained from which practically nothing more can be isolated, if, during chlorination, the temperature rises too quickly. This is brought about by condensation reactions of the very reactive chlorine atoms, standing in α-position to the nitrogen atoms, with hydrogen atoms not yet substituted by chlorine with splitting off of hydrochloric acid. This reaction sets in at about 130–140° C.

It is important to conduct the reaction with the temperature control indicated as required: The amino compounds are so completely saturated with chlorine at temperatures below 140° C. that in the subsequent chlorinating dissociation, which takes place between 140 and 300° C., condensation and polymerization reactions are prevented. Furthermore, the introduction of chlorine at lower temperatures renders positive the C-atoms situated in α-position to nitrogen and thereby favours the subsequent dissociation rather than any side reaction.

Compounds which are suitable as starting materials and which correspond to the above given general formula are, for example

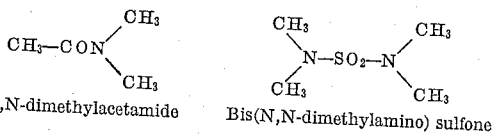

N,N-dimethylacetamide    Bis(N,N-dimethylamino) sulfone

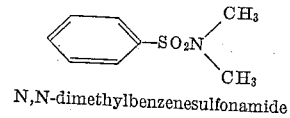

N,N-dimethylbenzenesulfonamide and the like.

The imide-chlorides, according to the invention, are obtained from these compounds by high temperature chlorination with the dissociation of acyl chloride.

This chlorination can also be carried out in the presence of inert solvents. For example, for substances whose melting point lies above 140° C. chlorination in such solvents as trichlorobenzene, pentachloroethane, hexachloroethane, acetylene-tetrachloride or the like is suitable.

By suitable choice of the starting component compounds can also be obtained which contain the imide chloride grouping

as part of an aromatized ring. This is the case if the nitrogen atom is in a five- or six-membered ring which is present in a nonaromatized hydroform.

Examples of this type are:

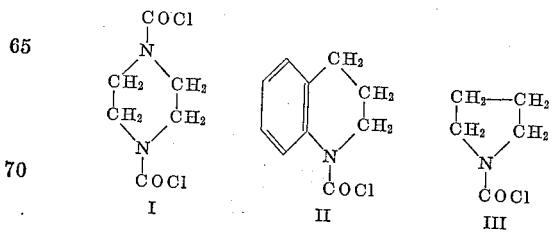

I          II          III

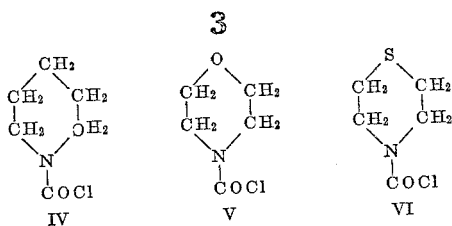

The above compounds are named as follows:

I. 1,4-piperazinedicarbonyl chloride,
II. 1-(1,2,3,4-tetrahydroquinoline)carbonyl chloride,
III. 1-pyrrolidinecarbonyl chloride,
IV. 1-piperidinecarbonyl chloride,
V. 4-morpholinecarbonyl chloride,
VI. 4-thiamorpholinecarbonyl chloride.

In this manner chloropyrazines are obtained, which are extremely difficult to produce by other methods, as well as pyridines, quinolines or similar compounds chlorinated in the 2-position.

The products obtainable according to the process of the invention, some of which are not obtainable by other methods and most of which are new are valuable intermediate products for the production of pest combatting agents, dyestuffs and synthetic materials. The products of the invention can also be used as plant protecting agents because of their activity against flies, spiders, mites and fungi. They further exhibit herbicidal properties.

The following examples are given for the purpose of illustrating the invention:

Example 1

598 parts by weight of piperazine-bis-carbamic acid chloride are melted at 150–160° C. and chlorine is introduced into the melt whilst irradiating with ultraviolet light. The increase of the chlorination temperature after termination of the exothermic reaction is 10° C. per hour. The product is further chlorinated for 3 hours at 210–220° C.

Subsequently fractional distillation is carried out. 438 parts by weight dichloropyrazine are obtained, boil point 71–74° C./12 mm. Hg, $n_D^{20}=1.5651$.

Analysis.—$C_4H_2N_2Cl_2$. Calculated: C, 32.2%; H, 0.55%; N, 15.2%; Cl, 58.1%. Found: C, 26.04%; H, 0.67%; N, 14.98%; Cl, 58.25%.

Pentachloropyridine is obtained in the same way from piperidine carbamic acid chloride, and tetrachloroquinoline from tetrahydroquinoline-carbamic acid chloride.

Example 2

492 parts by weight of morpholine carbamic acid chloride are first chlorinated at 20° C. whilst irradiating with ultraviolet light. The reaction is initially strongly exothermic and cooling has to be provided so that the temperature does not exceed 120° C. When the exothermic reaction has subsided chlorination is continued while increasing the temperature by 10° C. per hour until a temperature of 210° C. is reached. The product is further chlorinated at this temperature for 4 hours.

The compound obtained in this manner has, according to analysis and spectrum, the following constitution:

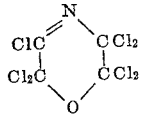

B.P. 125–128° C./12 mm. Hg, $n_D^{20}=1.5388$.
Analysis.—Calculated: C, 14.71%; N, 4.91%; Cl, 76.1%; O, 4.91%. Found: C, 14.87%; N, 4.82%; Cl, 76.25%; O, 4.71%.

Example 3

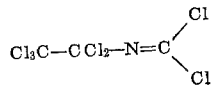

Chlorine is introduced into 234 parts by weight of n-(β-chloroethyl)-N-methyl-carbamic acid chloride at 120° C. for 9 hours whilst stirring and irradiating with ultraviolet light. The temperature of the reaction mixture is then raised to 210° C. within 6 hours and the mixture further chlorinated at this temperature for 10 hours. Excess chlorine and hydrogen chloride, formed as a by-product, are then driven out from the reaction mixture with nitrogen and the latter then subjected to fractional distillation in a vacuum. The pentachloroethylisocyanide dichloride distils over at a pressure of 13 mm. Hg at 120–121° C. as a colorless liquid of refractive index $n_D^{20}=1.5530$.

Analysis.—$C_3Cl_7N$ (298.2): Calculated: C, 12.09%; Cl, 83.25%; N, 4.70%. Found: C, 12.39%, 12.64%; Cl, 83.15%; N, 4.72%, 4.74%.

Example 4

149 parts by weight of N-methyl-N-acetyl aniline in 200 parts by weight of chloroform are chlorinated, first without irradiation, at temperatures between 50 and 60° C. until the reaction stops being exothermic (chlorination of the nucleus). The chlorination is then continued under ultraviolet irradiation. The temperature is raised in such a way that a temperature rise of about 10° C. per hour takes place. The chloroform is gradually evaporated by the strong stream of chlorine. When the temperature has reached 180° C. acetyl chloride or its chlorination products are split off. When the temperature has reached 200–220° C. chlorination is continued for a further 5 hours. 5% by weight of $FeCl_3$ or $AlCl_3$ are added to the reaction mixture which is then chlorinated for a further 8 hours without irradiation; 2,3,4,5,6-penta-chloro-phenyl-isocyanide dichloride is formed by an exothermic reaction. Boiling point 145–150° C./0.2 mm. The compound is obtained in the form of white crystals when recrystallized from ligroin.

Analysis. — $C_7H_7N$: Calculated: C, 24.24%; Cl, 71.72%; N, 4.04%. Found: C, 24.48%; Cl, 71.80%; N, 4.12%.

Example 5

300 parts by weight of β-(N-chlorocarbonyl-N-methyl-amino)-propionitrile are chlorinated under ultra-violet irradiation while stirring. The reaction temperature is gradually raised from 80 to 200° C. When the hydrogen chloride formation has subsided the reaction product is fractionated over a silver column. The 1-cyano-tetra-chloro-ethyl-2-isocyanide dichloride is obtained in the form of a pale yellow fluid having a boiling point of 122–124° C./15 mm.

Analysis.—$C_4Cl_6N_2$: Calculated: C, 16.63%; Cl, 73.64%; N, 9.70%. Found: C, 17.03%; Cl, 73.50%; N, 9.79%.

This compound kills mosquitos at a rate of 100% in 1 hour if applied in a 0.01% concentration, and in 3 hours if applied in a 0.001% concentration. Flies are killed at a 100% rate in 8 hours if the compound is applied in a 0.01% concentration.

We claim:
1. A process for the production of an organic compound containing chlorine and nitrogen combined in the —N=CCl— radical which comprises reacting a compound having the formula

wherein $R^1$ and $R^2$ when taken alone are each selected from the group consisting of lower alkyl, phenyl and halogen-substituted, cyano-substituted, lower alkyl-substituted, phenyl-substituted, amino-substituted and imino-substituted lower alkyl and phenyl radicals, and $R^1$ and $R^2$ when taken together with the N— to which each is attached stands for a 5 or 6 membered heterocyclic radical, $R^1$ and $R^2$ together in said heterocyclic radical being selected from the group consisting of alkylene, dialkylene ether, dialkylene thioether, and 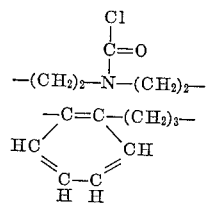

X stands for an acyl radical of the group consisting of —COCl, —COBr, —COF, —COR in which R stands for an alkyl radical, —COR in which R stands for an aryl radical, CN, —SO₂Cl, —SO₂R in which R stands for an alkyl radical, and —SO₂R in which R stands for an aryl radical, with chlorine, while it is irradiated with ultraviolet light at a temperature below 140° C. for such a period that replaceable hydrogen atoms of the compound are replaced by chlorine atoms, and then treating the resulting chlorine-containing compound with additional chlorine at a higher temperature between 140° and 300° C. while it is irradiated with ultraviolet light and subsequently recovering the latter compound.

2. The process according to claim 1 wherein X stands for —COCl.

3. A process for the production of pentachloropyridine which comprises reacting 1-piperidinecarbonyl chloride with chlorine while it is irradiated with ultraviolet light at a temperature between 150 and 160° C. for a period of time sufficient to produce a ring-chlorinated compound and subsequently continuing the reaction with chlorine while the mixture is irradiated with ultraviolet light at a temperature between 210° and 220° C. for a period sufficient to expel phosgene and convert the intermediate product to pentachloropyridine.

4. A process which comprises reacting 4-morpholinecarbonyl chloride with chlorine while irradiated with ultraviolet light at a temperature between approximately 20° C. and 120° C. and continuing the chlorination at an increasing temperature to 210° C. and for a sufficient period of time thereafter to convert the product to a product having the formula

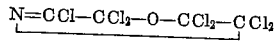

5. A process for the production of pentachloroethylimidocarbonyl chloride which comprises reacting N-(2-chloroethyl)-N-methylcarbonyl chloride with chlorine while it is irradiated with ultraviolet light at a temperature of approximately 120° C. and subsequently continuing the reaction with chlorine at a temperature of 210° C. while the mixture is irradiated with ultraviolet light until pentachloroethylimidocarbonyl chloride is formed.

6. A process for the production of N-(2,3,4,5,6-pentachlorophenyl)imidocarbonyl chloride which comprises reacting N-methylacetanilide in solution in chloroform with chlorine while it is irradiated with ultraviolet light at a temperature of below 180° C., continuing the heating at 180° C. while acetyl chloride is evolved, and subsequently adding a catalytic amount of a Friedel-Crafts catalyst of the group consisting of ferric chloride and aluminum choride until the reaction mixture contains N-(2,3,4,5,6-pentachlorophenyl)imidocarbonyl chloride and subsequently recovering the N-(2,3,4,5,6-pentachlorophenyl) imido carbonyl chloride.

7. A process for the production of N-(1-cyanotetrachloroethyl)imidocarbonyl chloride which comprises reacting 2-(N-chlorocarbonyl-N-methylamino)propionitrile with chloride while it is irradiated with ultraviolet light at a temperature gradually rising from 80 to 200° C. while hydrogen chloride is evolved, and subsequently recovering the N-(1-cyanotetrachloroethyl)imidocarbonyl chloride thus formed from the reaction mixture.

8. A process for the production of N-(2,3,4,5,6-pentachlorophenyl)imidocarbonyl chloride which comprises reacting N-methylacetanilide with chlorine while it is irradiated with ultraviolet light at a temperature between 50 and 60° C. for a period of time sufficient to produce a ring-chlorinated compound and subsequently continuing the reaction with chlorine while the mixture is irradiated with ultraviolet light at a temperature between 180° and 220° C. for a period sufficient to expel acetyl chloride and convert the intermediate product to N-(2,3,4,5,6-pentachlorophenyl)imidocarbonyl chloride, and subsequently recovering the latter.

References Cited

Hackh's Chemical Dictionary, second edition, 1937, published by P. Blakiston's Son & Co., p. 501.

Houben-Weyl, "Methoden der Organischen Chemie," vol. V/3, pp. 640–642 and 916–920, May 1962.

Stedman's Medical Dictionary, seventeenth revised edition, 1949, published by Williams & Wilkins Co., p. 613, p 12158.

WALTER A. MODANCE, *Primary Examiner.*

IRVING MARCUS, *Examiner.*

M. W. WESTERN, ROBERT T. BOND,
*Assistant Examiners.*